United States Patent
Asbe et al.

(10) Patent No.: US 10,228,991 B2
(45) Date of Patent: Mar. 12, 2019

(54) PROVIDING HARDWARE-BASED TRANSLATION LOOKASIDE BUFFER (TLB) CONFLICT RESOLUTION IN PROCESSOR-BASED SYSTEMS

(71) Applicant: QUALCOMM Incorporated, San Diego, CA (US)

(72) Inventors: Samar Asbe, San Diego, CA (US); Thomas Philip Speier, Wake Forest, NC (US)

(73) Assignee: QUALCOMM Incorporated, San Diego, CA (US)

(*) Notice: Subject to any disclaimer, the term of this patent is extended or adjusted under 35 U.S.C. 154(b) by 113 days.

(21) Appl. No.: 15/636,434

(22) Filed: Jun. 28, 2017

(65) Prior Publication Data
US 2019/0004883 A1 Jan. 3, 2019

(51) Int. Cl.
| | |
|---|---|
| *G06F 12/10* | (2016.01) |
| *G06F 11/07* | (2006.01) |
| *G06F 12/1036* | (2016.01) |
| G06F 12/0806 | (2016.01) |
| G06F 12/1027 | (2016.01) |

(52) U.S. Cl.
CPC ........ *G06F 11/073* (2013.01); *G06F 12/1036* (2013.01); *G06F 12/0806* (2013.01); *G06F 12/1027* (2013.01); *G06F 2212/682* (2013.01); *G06F 2212/683* (2013.01)

(58) Field of Classification Search
CPC ............. G06F 12/0806; G06F 12/0811; G06F 12/1027; G06F 12/1036; G06F 12/109; G06F 2212/68; G06F 2212/681; G06F 2212/682; G06F 2212/683; G06F 2212/684
USPC ................................. 711/206, 207, 208, 210
See application file for complete search history.

(56) References Cited

U.S. PATENT DOCUMENTS

| | | | |
|---|---|---|---|
| 5,963,984 A * | 10/1999 | Garibay, Jr. | G06F 12/1027 711/202 |
| 6,839,813 B2 | 1/2005 | Chauvel | |
| 7,653,803 B2 | 1/2010 | Hummel et al. | |
| 8,127,111 B1 | 2/2012 | Wentzlaff et al. | |
| 8,195,917 B2 | 6/2012 | Hohmuth et al. | |
| 8,700,883 B1 | 4/2014 | Glasco et al. | |

(Continued)

*Primary Examiner* — Gary J Portka
(74) *Attorney, Agent, or Firm* — Withrow & Terranova, PLLC

(57) ABSTRACT

Providing hardware-based translation lookaside buffer (TLB) conflict resolution in processor-based systems is disclosed. In this regard, in one aspect, a memory system provides a memory management unit (MMU) and multiple hierarchical page tables, each comprising multiple page table entries comprising corresponding translation preference indicators. The memory system further includes a TLB comprising multiple TLB entries each configured to cache a page table entry. The MMU determines whether a TLB conflict exists between a first TLB entry caching a first page table entry comprising a translation preference indicator that is set and a second TLB entry caching a second page table entry comprising a translation preference indicator that is not set. If so, the MMU selects the first TLB entry for use in a virtual-to-physical address translation operation, based on the translation preference indicator of the first page table entry cached by the first TLB entry being set.

23 Claims, 10 Drawing Sheets

(56) References Cited

U.S. PATENT DOCUMENTS

| | | | |
|---|---|---|---|
| 2004/0006679 A1* | 1/2004 | Chiba | G06F 12/1027 |
| | | | 711/207 |
| 2010/0037028 A1* | 2/2010 | Shen | G06F 12/1027 |
| | | | 711/154 |
| 2016/0259735 A1* | 9/2016 | Evans | G06F 12/1036 |
| 2016/0321185 A1 | 11/2016 | Doshi et al. | |

* cited by examiner

PROVIDING HARDWARE-BASED TRANSLATION LOOKASIDE BUFFER (TLB) CONFLICT RESOLUTION IN PROCESSOR-BASED SYSTEMS

BACKGROUND

I. Field of the Disclosure

The technology of the disclosure relates generally to computer memory systems, and more particularly to memory systems configured to provide virtual-to-physical memory address translations.

II. Background

Virtual memory is a memory management mechanism provided by modern processor-based systems to map memory addresses referenced by executing processes (i.e., "virtual addresses") to physical addresses within system memory. By using virtual memory, processor-based systems are able to provide access to a virtual memory space larger than the actual physical memory space, and enhance inter-process security through memory isolation. The mapping of virtual memory addresses to their corresponding physical memory addresses is accomplished using data structures known as page tables. Some processor-based systems employ multi-level page tables arranged in a hierarchical tree structure, with entries in higher-level page tables (such as a Level 2 (L2) page table) representing either a virtual-to-physical memory address mapping for a memory page, or a pointer to a lower-level page table such as a Level 3 (L3) page table. In this manner, the higher-level page tables in the hierarchy may provide mappings to larger memory pages, while the lower-level page tables may provide finer-grained mappings to smaller memory pages. To improve performance, page table entries are cached in a data structure referred to as a translation lookaside buffer, or TLB.

During operation of a processor-based system, updates to page tables may give rise to conflicts between two or more entries within a TLB. For example, when a lower-level page table is fully mapped (i.e., when all virtual memory addresses within a memory region represented by the lower-level page table have been assigned to corresponding physical memory addresses that are associated with identical memory page attributes and/or permissions), the lower-level page table mappings may be consolidated into a new virtual-to-physical memory address mapping represented by a single page table entry in the next-higher page table. After consolidation is complete, the lower-level page table may be deallocated, thus freeing memory for other uses by the processor-based system. However, the process of consolidation may result in an interval of time in which the TLB still retains cached entries that conflict with each other. For example, the TLB may contain an older cached virtual-to-physical memory address mapping from the lower-level page table, as well as a newer cached virtual-to-physical memory address mapping referencing a same virtual address from the higher-level page table. TLB conflicts may also arise, as a non-limiting example, after the TLB is updated to cache a single TLB entry that covers multiple page table entries representing a contiguous block of memory, while still caching an older TLB entry to one of the multiple page table entries. Such conflicts may result in memory faults that must be handled by supervisory software such as operating system kernels.

One approach to reducing the occurrence of such faults is the "break before make" approach, under which a higher-level page table mapping is unmapped and any TLB entries for the lower-level page table mappings are invalidated before the new higher-level page table mapping and corresponding TLB entries are created. However, even under the "break before make" approach, memory accesses to the memory regions for which mappings are temporarily broken will still generate memory faults. Moreover, the "break before make" approach is inefficient when used in conjunction with other modern architectural features such as virtualization extensions and system memory management units (MMUs), and may be overkill in systems in which memory faults need to be handled simultaneously across central processing units (CPUs) and multiple system MMUs. Another approach to reducing the occurrence of memory faults resulting from TLB conflicts is to simply invalidate all conflicting TLB entries whenever a conflict is detected. This approach, though, may mask potential software issues that may actually be responsible for the TLB conflict (as opposed to conflicts that may result when the "break before make" approach is not followed). Thus, a mechanism for providing TLB conflict resolution in hardware without requiring software intervention is desirable.

SUMMARY OF THE DISCLOSURE

Aspects according to this disclosure include providing hardware-based translation lookaside buffer (TLB) conflict resolution in processor-based systems. In some aspects, a memory system provides a memory management unit (MMU) that includes a plurality of hierarchical page tables. Each page table entry within the plurality of hierarchical page tables provides a translation preference indicator. The translation preference indicator is stored as part of a TLB tag when the page table entry is cached in a TLB entry of a TLB. If a subsequent virtual-to-physical memory address translation operation detects multiple conflicting TLB entries within the TLB, the TLB entry caching a page table entry having a translation preference indicator that is set is used over any conflicting TLB entries caching page table entries having a translation preference indicator that is not set. In this manner, if a TLB conflict or other multi-hit erroneous condition occurs, the MMU hardware can correct the situation and continue with the memory address translation process, instead of generating a memory fault and requiring the involvement of a software page table management entity. According to some aspects, a translation preference indicator may be set during consolidation of a lower-level page table into a higher-level page table, whereby the translation preference indicator is set when the higher-level page table is updated and the TLB entries for the lower-level page table are invalidated. The translation preference indicator of the page table entry of the higher-level page table may then be cleared after deallocation of the lower-level page table is complete. Some aspects may also provide that, before a page table entry of a higher-level page table having a translation preference indicator that is set is cached in the TLB, other existing TLB entries that may cause a conflict are identified and invalidated.

In another aspect, a memory system of a processor-based system is provided. The memory system comprises an MMU and a plurality of hierarchical page tables, each comprising a plurality of page table entries comprising a corresponding plurality of translation preference indicators. The memory system further includes a TLB comprising a plurality of TLB entries, each TLB entry configured to cache a page table entry of the plurality of page table entries. The MMU is configured to determine whether a TLB conflict exists between a first TLB entry caching a first page table entry comprising a translation preference indicator that is set and a second TLB entry caching a second page table entry comprising a translation preference indicator that is not set. Responsive to determining that a TLB conflict exists, the MMU is further configured to select the first TLB entry for use in a virtual-to-physical address translation operation, based on the translation preference indicator of the first page table entry cached by the first TLB entry being set.

In another aspect, a method for providing hardware-based TLB conflict resolution is provided. The method comprises configuring a plurality of page table entries of a plurality of hierarchical page tables to store a corresponding translation preference indicator. The method further comprises determining, by an MMU of a processor-based system, whether a TLB conflict exists between a first TLB entry of a plurality of TLB entries of a TLB and a second TLB entry of the plurality of TLB entries of the TLB. Each TLB entry is configured to cache a page table entry of the plurality of page table entries of the plurality of hierarchical page tables, and the first TLB entry caches a first page table entry comprising a translation preference indicator that is set, and a second TLB entry caches a second page table entry comprising a translation preference indicator that is not set. The method also comprises, responsive to determining that a TLB conflict exists, selecting the first TLB entry for use in a virtual-to-physical address translation operation, based on the translation preference indicator of the first page table entry cached by the first TLB entry being set.

In another aspect, a memory system for providing hardware-based TLB conflict resolution is provided. The memory system comprises a means for configuring each of a plurality of page table entries of a plurality of hierarchical page tables to store a corresponding translation preference indicator. The memory system further comprises a means for determining whether a TLB conflict exists between a first TLB entry of a plurality of TLB entries of a TLB and a second TLB entry of the plurality of TLB entries of the TLB. Each TLB entry is configured to cache a page table entry of the plurality of page table entries of the plurality of hierarchical page tables, and the first TLB entry caches a first page table entry comprising a translation preference indicator that is set, and a second TLB entry caches a second page table entry comprising a translation preference indicator that is not set. The memory system also comprises a means for selecting the first TLB entry for use in a virtual-to-physical address translation operation, based on the translation preference indicator of the first page table entry cached by the first TLB entry being set, responsive to determining that a TLB conflict exists.

DETAILED DESCRIPTION

Figure 1:
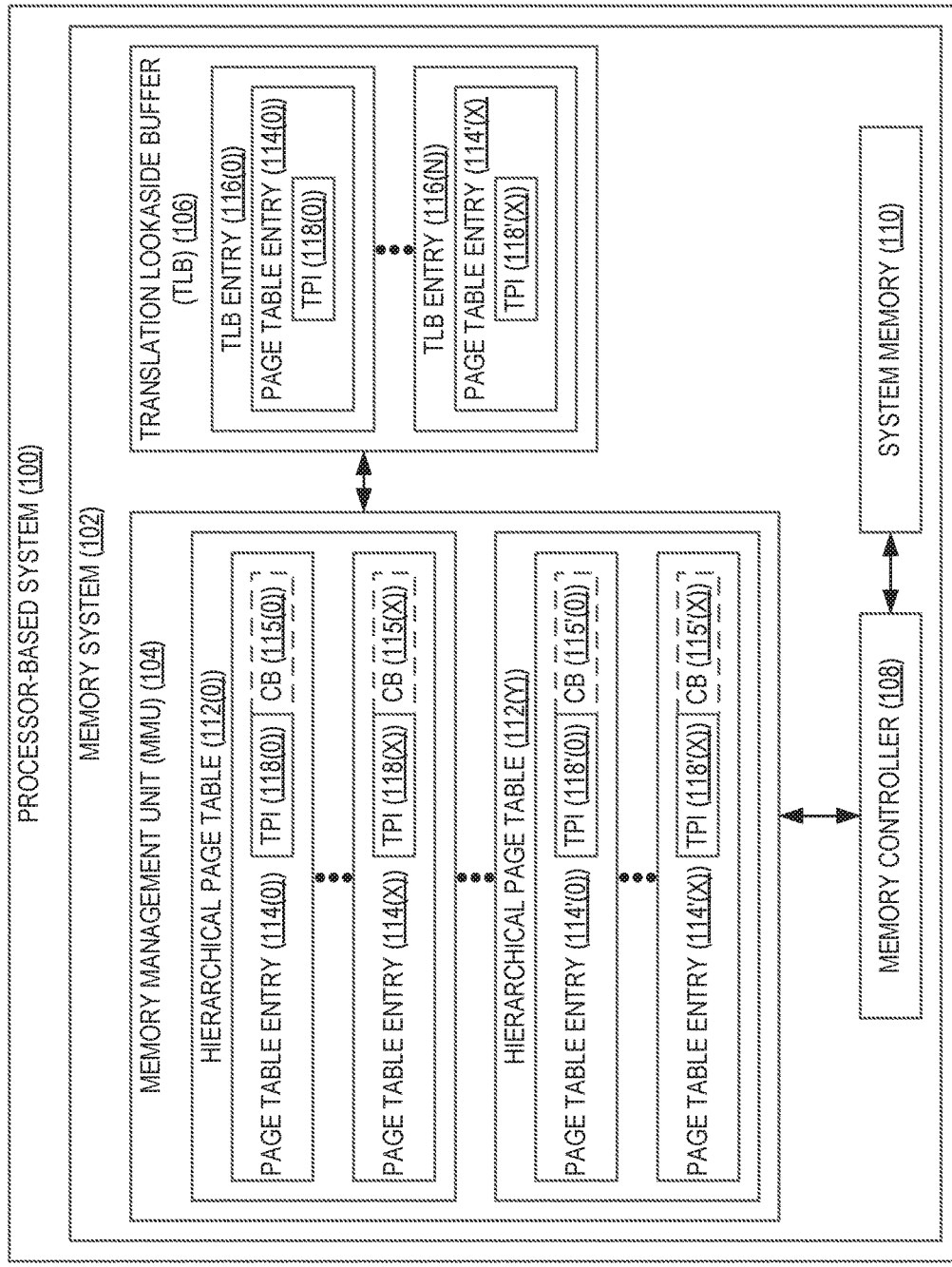
FIG. 1 is a block diagram of an exemplary processor-based system featuring a memory system including a memory management unit (MMU) configured to provide multiple hierarchical page tables in which translation preference indicators are provided for each page table entry.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects of the present disclosure involve providing hardware-based translation lookaside buffer (TLB) conflict resolution in processor-based systems. As noted above, operations such as page table consolidation may result in a TLB containing multiple conflicting entries for a given virtual memory address. Any attempt to access a memory region represented by the conflicting TLB entries may result in a memory fault that must be handled by supervisory software such as operating system kernels. Thus, a mechanism for providing hardware-level resolution of TLB conflicts (and other memory faults arising from multiple TLB entries) is desirable.

In this regard, FIG. 1 is a block diagram of an exemplary processor-based system 100 that includes a memory system 102 providing a memory management unit (MMU) 104 that is configured to manage memory accesses. The MMU 104 is communicatively coupled to a TLB 106 for caching recently used virtual-to-physical memory address translations. As shown in FIG. 1, the MMU 104 is also communicatively coupled to a memory controller 108 that is configured to perform memory read and write operations on a system memory 110. The system memory 110 in some aspects may comprise double data rate (DDR) synchronous dynamic random access memory (SDRAM), as a non-limiting example. In some aspects, the TLB 106 may be provided as a constituent element of the MMU 104. Some aspects may provide that the MMU 104 comprises a constituent element of a central processing unit (CPU) (not shown) or processor core (not shown) of the processor-based system 100, or comprises a standalone element of the processor-based system 100 (e.g., as a system MMU).

The processor-based system 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor-based system 100 may include elements in addition to those illustrated in FIG. 1, and/or may include more or fewer of the elements illustrated in FIG. 1. As a non-limiting example, the processor-based system 100 may include multiple MMUs 104 as system MMUs 104.

The MMU 104 of FIG. 1 is responsible for performing virtual-to-physical memory address translation operations in support of the virtual memory functionality of the processor-based system 100. Accordingly, the MMU 104 includes a plurality of hierarchical page tables 112(0)-112(Y). Each of the hierarchical page tables 112(0)-112(Y) include a plurality of page table entries 114(0)-114(X), 114'(0)-114'(X), each of which may represent a mapping for a subdivision of the addressable virtual memory space having a specific size. The page table entries 114(0)-114(X) of the higher-level hierarchical page table 112(0) may represent larger subdivisions of memory (e.g., one gigabyte (1 GB)), while the page table entries 114'(0)-114'(X) of the lower-level hierarchical page table 112(Y) may represent smaller subdivisions of memory (e.g., four kilobytes (4 KB)). In some aspects, each of the page table entries 114(0)-114(X), 114'(0)-114'(X) may comprise a block entry, a page entry, or a page table pointer entry. Some aspects may provide that the page table entries 114(0)-114(X), 114'(0)-114'(X) include contiguous bits ("CB") 115(0)-115(X), 115'(0)-115'(X). The contiguous bits (CB) 115(0)-115(X), 115'(0)-115'(X) of a plural subset (i.e., two or more) of the page table entries 114(0)-114(X), 114'(0)-114'(X) may be set when those page table entries 114(0)-114(X), 114'(0)-114'(X) are determined to represent a contiguous block of memory.

The mappings stored by the page table entries 114(0)-114(X), 114'(0)-114'(X) of the hierarchical page tables 112(0)-112(Y) of the MMU 104 may be cached in TLB entries 116(0)-116(N) of the TLB 106. In this manner, frequently used virtual-to-physical memory address mappings do not have to be recalculated for every memory access request performed by the MMU 104. In some aspects, a single one of the TLB entries 116(0)-116(N) may represent multiple page table entries 114(0)-114(X), 114'(0)-114'(X) having contiguous bits ("CB") 115(0)-115(X), 115'(0)-115'(X) that are set. However, as discussed above, the possibility exists for conflicts to arise among the TLB entries 116(0)-116(N). For example, an operation to consolidate a lower-level page table (such as the hierarchical page table 112(Y)) into a higher-level page table (such as the hierarchical page table 112(0)) may result in multiple TLB entries 116(0)-116(N) storing conflicting mappings for the same virtual address. Likewise, caching a TLB entry 116(0)-116(N) representing multiple page table entries 114(0)-114(X), 114'(0)-114'(X) having contiguous bits ("CB") 115(0)-115(X), 115'(0)-115'(X) set may give rise to a TLB conflict with an older TLB entry 116(0)-116(N) representing one of the multiple page table entries 114(0)-114(X), 114'(0)-114'(X). In a conventional memory system, the memory faults resulting from the conflicting mappings must then be handled by software.

Accordingly, to enable the MMU 104 to resolve potential TLB conflicts in hardware, the page table entries 114(0)-114(X), 114'(0)-114'(X) include corresponding translation preference indicators (TPIs) 118(0)-118(X), 118'(0)-118'(X). In some aspects, the translation preference indicators 118(0)-118(X), 118'(0)-118'(X) comprise one or more bits of each of the page table entries 114(0)-114(X), 114'(0)-114'(X), and may be cached in the TLB entries 116(0)-116(N) along with the corresponding page table entries 114(0)-114(X), 114'(0)-114'(X). For example, as seen in FIG. 1, the TLB entry 116(0) is presently caching the page table entry 114(0) having the translation preference indicator 118(0), while the TLB entry 116(N) presently caches the page table entry 114'(X) having the translation preference indicator 118' (X). In some aspects, the translation preference indicators 118(0)-118(X), 118'(0)-118'(X) may be stored as part of TLB entry tags (not shown) used to identify each of the plurality of TLB entries 116(0)-116(N).

If the MMU 104 detects that multiple TLB entries 116(0)-116(N) may correspond to a given virtual memory address and thus may give rise to a TLB conflict, the MMU 104 is configured to select the TLB entry 116(0)-116(N) that is caching a page table entry 114(0)-114(X), 114'(0)-114'(X) having a translation preference indicator 118(0)-118(X), 118'(0)-118'(X) that is set for use in a virtual-to-physical memory address translation operation. Operations for setting and clearing the translation preference indicators 118(0)-118(X), 118'(0)-118'(X) according to some aspects are discussed in greater detail below with respect to FIG. 5, while operations for preemptively invaliding TLB entries 116(0)-116(N) to avoid potential TLB conflicts are discussed in greater detail below with respect to FIG. 6.

Figure 2A:
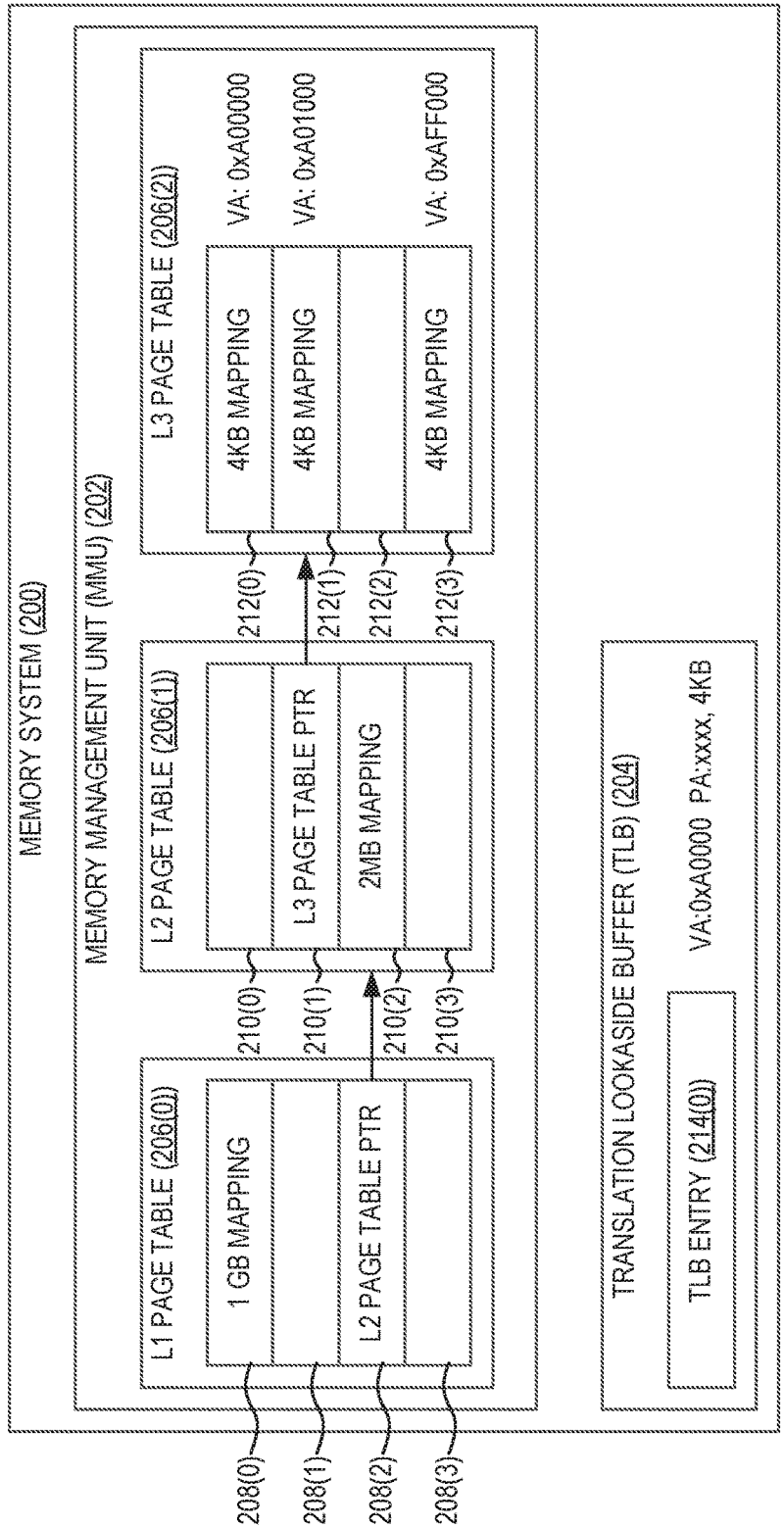
FIGS. 2A-2C are block diagrams illustrating exemplary conventional operations for consolidating a lower-level page table into a higher-level page table in a manner that may result in a translation lookaside buffer (TLB) conflict.
Figure 2B:
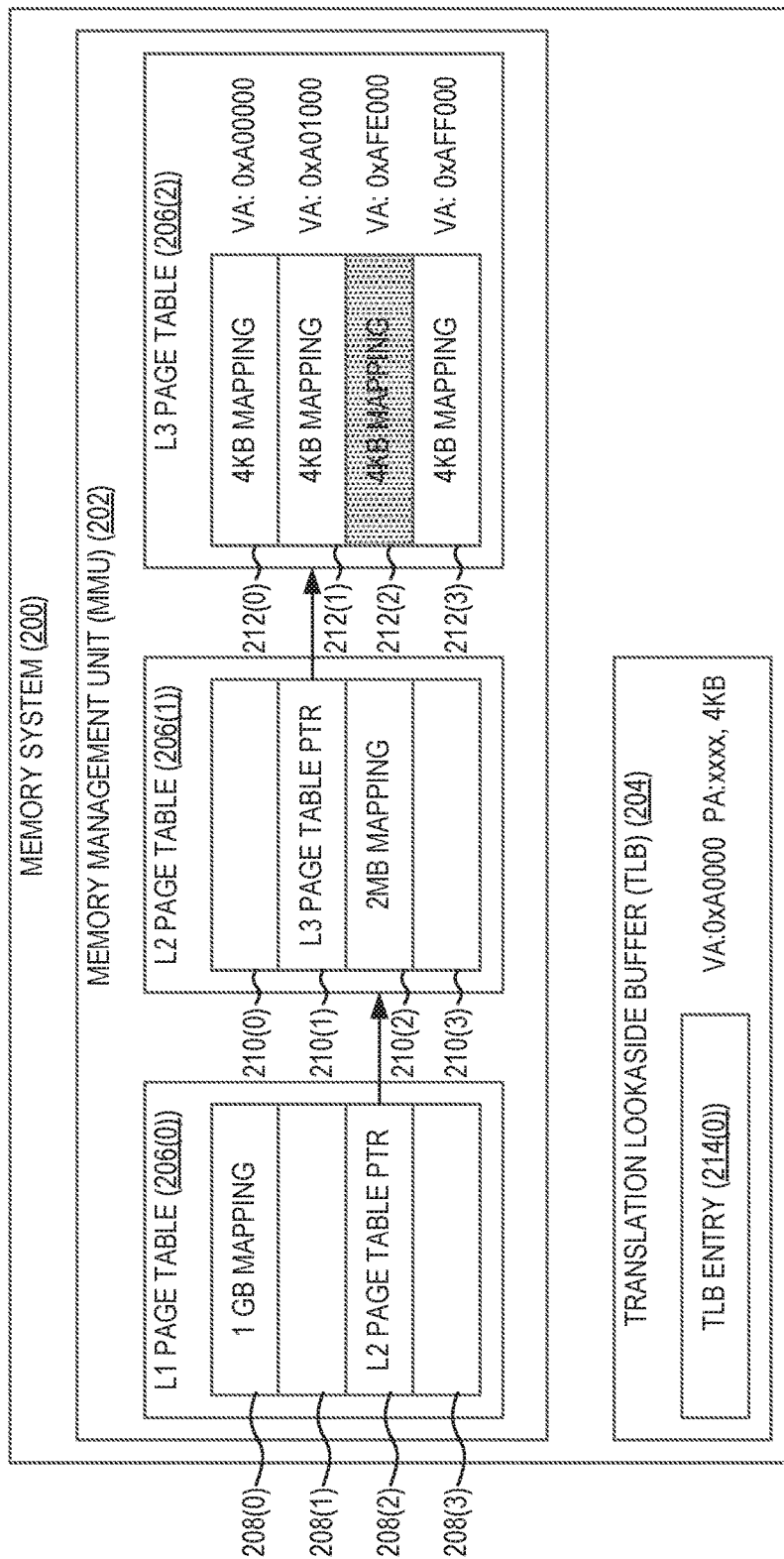
Figure 2C:
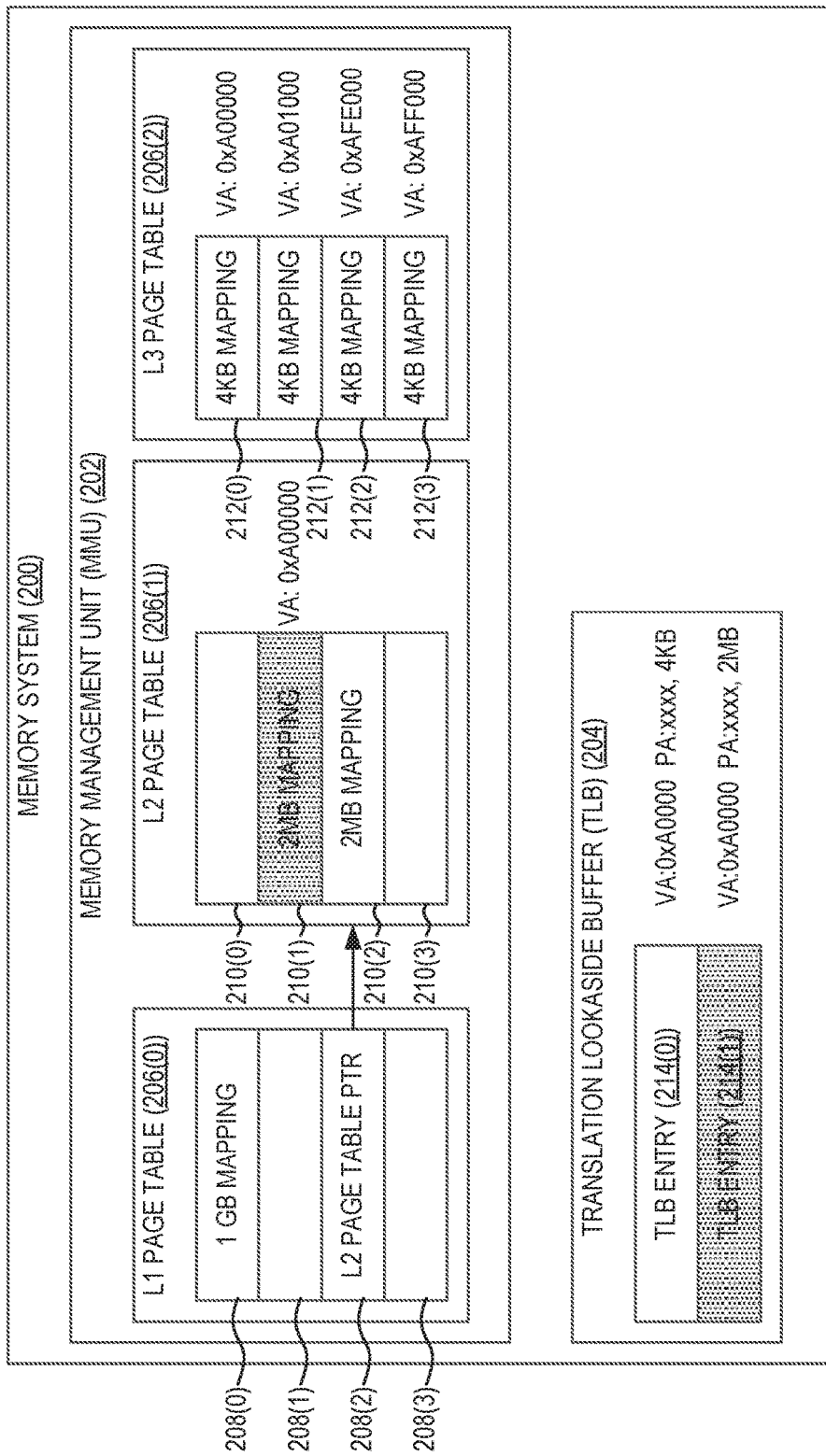

Before discussing how the MMU 104 uses the translation preference indicators 118(0)-118(X), 118'(0)-118'(X) to select a TLB entry 116(0)-116(N) for use in a virtual-to-physical memory address translation operation, the operations of a conventional memory system for consolidating a lower-level page table into a higher-level page table in a manner that may result in a TLB conflict are first discussed. In this regard, FIGS. 2A-2C illustrate a memory system 200 providing an MMU 202 and a TLB 204. The MMU 202 includes three (3) hierarchical page tables 206(0)-206(2), which are referred to herein as "L1 page table 206(0)," "L2 page table 206(1)," and "L3 page table 206(2)." The L1 page table 206(0) includes page table entries 208(0)-208(3), each of which may represent either a mapping for a one gigabyte (1 GB) subdivision of the virtual memory space or a pointer to the L2 page table 206(1). Similarly, the L2 page table 206(1) provides page table entries 210(0)-210(3), each of which may represent either a two megabyte (2 MB) mapping or a pointer to the L3 page table 206(2). Page table entries 212(0)-212(3) of the L3 page table 206(2) each represent a mapping for a 4 kilobyte (4 KB) subdivision of the virtual memory space.

In an initial state shown in FIG. 2A, the page table entry 210(1) of the L2 page table 206(1) contains a pointer to the L3 page table 206(2), while all of the page table entries 212(0)-212(3) of the L3 page table 206(2) store mappings except for the page table entry 212(2), which is presently empty. Additionally, the mapping of the first page table entry 212(0) of the L3 page table 206(2) is cached in a TLB entry 214(0) of the TLB 204 of FIG. 2A.

Referring now to FIG. 2B, the last empty page table entry 212(2) of the L3 page table 206(2) is mapped. Now that all of the page table entries 212(0)-212(3) of the L3 page table 206(2) have been mapped, the MMU 202 determines that the mappings represented by the L3 page table 206(2) should be consolidated into the single page table entry 210(1) of the L2 page table 206(1), which currently stores a pointer to the L3 page table 206(2). FIG. 2C illustrates the result of the consolidation. The page table entry 210(1) of the L2 page table 206(1) now maps the virtual address that was formerly mapped by the page table entry 212(0) of the L3 page table 206(2). The MMU 202 may now deallocate the L3 page table 206(2) and reuse the memory for other purposes.

However, a problem may arise if the mapping stored in the page table entry 210(1) of the L2 page table 206(1) is cached in a TLB entry 214(1) of the TLB 204 while the TLB entry 214(0) is still present in the TLB 204. In this case, any subsequent attempt by the MMU 202 to perform a virtual-to-physical memory address translation operation for a memory page corresponding to the virtual address of the TLB entries 214(0) and 214(1) will result in a memory fault.

Figure 3:
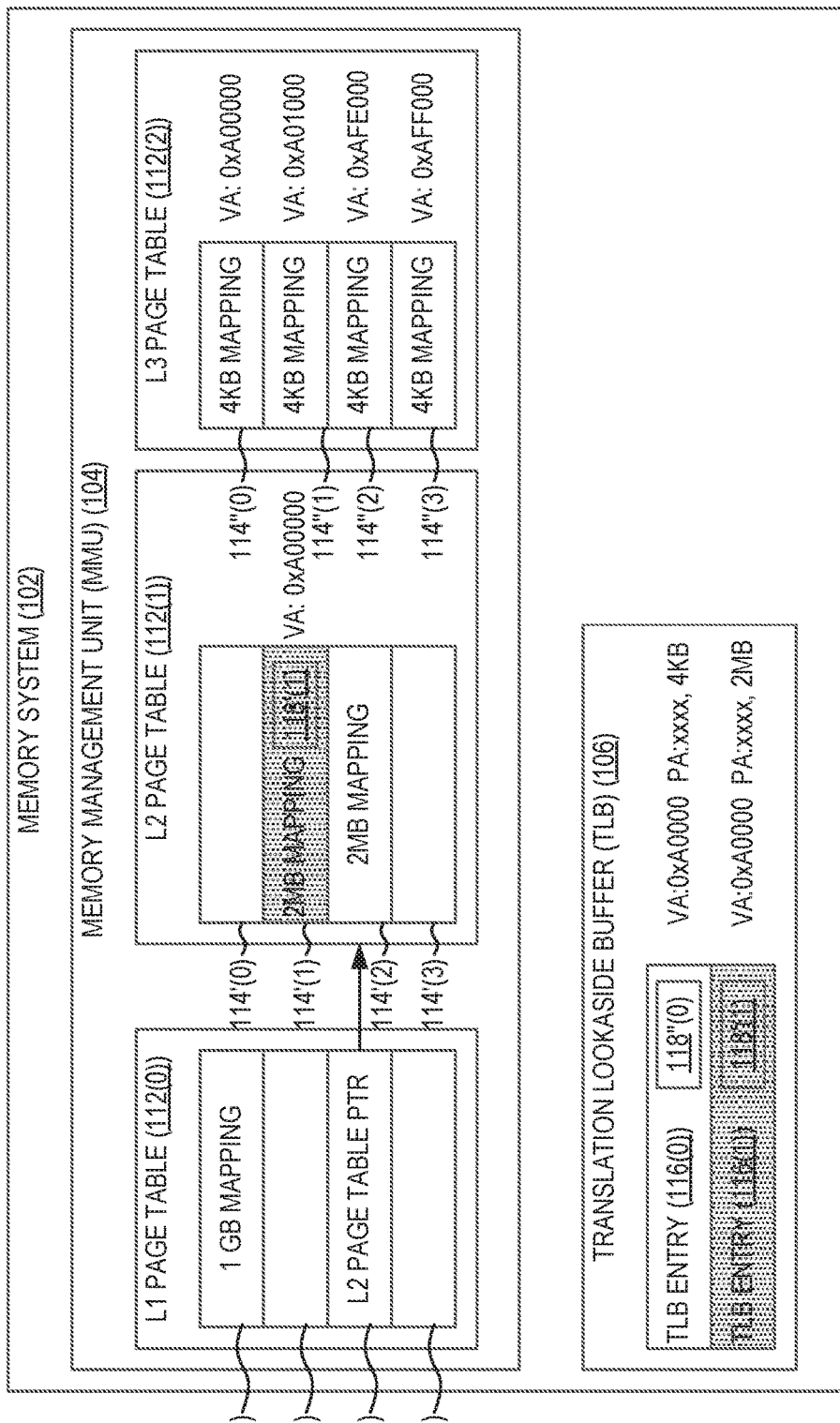
FIG. 3 is a block diagram illustrating exemplary operations for consolidating a lower-level page table into a higher-level page table by the memory system of FIG. 1 to provide hardware-based TLB conflict resolution.

FIG. 3 illustrates how the same consolidation operation and TLB caching may be handled by aspects of the memory system 102 of FIG. 1. In FIG. 3, the scenario shown in FIG. 2C is shown using the memory system 102, the MMU 104, and the TLB 106 of FIG. 1. The hierarchical page tables 112(0)-112(2) (i.e., "L1 page table 112(0)," "L2 page table 112(1)," and "L3 page table 112(2)") provide page table entries 114(0)-114(3), 114'(0)-114'(3), and 114"(0)-114"(3), respectively. Additionally, the page table entry 114'(1) of the L2 page table 112(1) also includes the translation preference indicator 118'(1), which is assumed to be set. Likewise, the TLB 106 includes the TLB entries 116(0) and 116(1), which store the translation preference indicator 118"(0) (corresponding to the page table entry 114"(0) of the L3 page table 112(2) and assumed to not be set) and the translation preference indicator 118'(1) (corresponding to the page table entry 114'(1) of the L2 page table 112(1)).

In the example of FIG. 3, the MMU 104, upon attempting to perform a virtual-to-physical memory address translation operation, detects that a conflict exists between the TLB entries 116(0) and 116(1). The MMU 104 then determines that the translation preference indicator 118"(0) of the TLB entry 116(0) is not set, while the translation preference indicator 118'(1) of the TLB entry 116(1) is set. The MMU 104 thus would use the TLB entry 116(1) for the virtual-to-physical memory address translation operation, based on the translation preference indicator 118'(1) of the TLB entry 116(1) being set. In this manner, a memory fault is preempted, and the need for supervisory software intervention is avoided.

It is to be understood that circumstances other than those illustrated in FIG. 3 may give rise to TLB conflicts that can be addressed by the MMU 104. As a non-limiting example, assume that the TLB 106 contains the TLB entry 116(0) corresponding to, for example, the page table entry 114(1). If the page table entry 114(1) is subsequently updated such that the entire group of page table entries 114(0)-114(X) represents a contiguous block of memory, the contiguous bits ("CB") 115(0)-115(X) for the page table entries 114(0)-114(X) will all be set. The TLB 106 may then be updated with a new TLB entry (e.g., TLB entry 116(1)) that corresponds to the entire memory block represented by the page table entries 114(0)-114(X). In this case, if the TLB entry 116(0) is still present in the TLB 106, a TLB conflict may subsequently arise between the TLB entry 116(0) and the TLB entry 116(1).

To address this issue, the MMU 104 in such a scenario is configured to set the translation preference indicators 118(0)-118(X) of the page table entries 114(0)-114(X) along with setting the contiguous bits ("CB") 115(0)-115(X) for the page table entries 114(0)-114(X) and before the new TLB entry 116(1) corresponding to the entire memory block represented by the page table entries 114(0)-114(X) is fetched into the TLB 106. In this manner, the new TLB entry 116(1) fetched into the TLB 106 will have a translation preference indicator 118(1) that is set, indicating to the MMU 104 that the TLB entry 116(1) should be used in the event of a TLB conflict.

Figure 4:
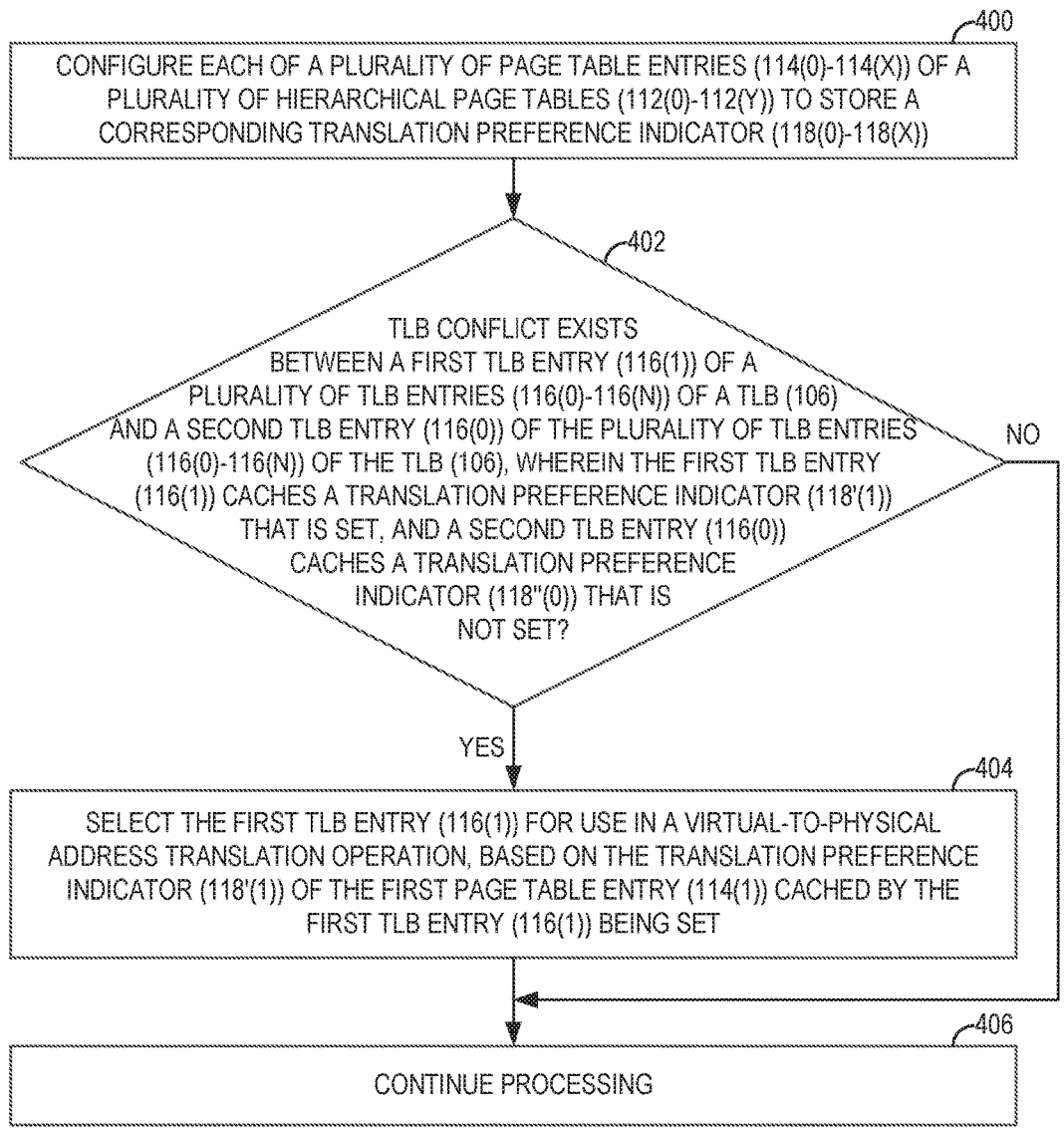
FIG. 4 is a flowchart illustrating exemplary operations of the memory system of FIG. 1 for providing hardware-based TLB conflict resolution in processor-based systems.

To illustrate exemplary operations of the memory system 102 of FIG. 1 for providing hardware-based TLB conflict resolution in processor-based systems such as the processor-based system 100, FIG. 4 is provided. Elements of FIGS. 1 and 3 are referenced in describing FIG. 4 for the sake of clarity. Operations in FIG. 4 begin with the MMU 104 configuring each of a plurality of page table entries 114(0)-114(X) of a plurality of hierarchical page tables 112(0)-112(Y) to store a corresponding translation preference indicator 118(0)-118(X) (block 400). In this regard, the MMU 104 may be referred to herein as "a means for configuring each of a plurality of page table entries of a plurality of hierarchical page tables to store a corresponding translation preference indicator."

Upon receiving a request to perform a virtual-to-physical memory address translation operation, the MMU 104 determines whether a TLB conflict exists between a first TLB entry 116(1) of a plurality of TLB entries 116(0)-116(N) of a TLB 106 and a second TLB entry 116(0) of the plurality of TLB entries 116(0)-116(N) of the TLB 106, wherein each TLB entry 116(0)-116(N) is configured to cache a page table entry 114 of the plurality of page table entries 114(0)-114(X) of the plurality of hierarchical page tables 112(0)-112(Y). The first TLB entry 116(1) caches a first page table entry 114'(1) comprising a translation preference indicator 118'(1) that is set, and a second TLB entry 116(0) caches a second page table entry 114"(0) comprising a translation preference indicator 118"(0) that is not set (block 402). Accordingly, the MMU 104 may be referred to herein as "a means for determining whether a TLB conflict exists between a first TLB entry of a plurality of TLB entries of a TLB and a second TLB entry of the plurality of TLB entries of the TLB." If a TLB conflict exists between the first TLB entry 116(1) and the second TLB entry 116(0), the MMU 104 is configured to select the first TLB entry 116(1) for use in a virtual-to-physical address translation operation, based on the translation preference indicator 118'(1) of the first page table entry 114'(1) cached by the first TLB entry 116(1) being set (block 404). The MMU 104 thus may be referred to herein as "a means for selecting the first TLB entry for use in a virtual-to-physical address translation operation, based on the translation preference indicator of the first page table entry cached by the first TLB entry being set, responsive to determining that a TLB conflict exists." Processing then resumes (block 406). If the MMU 104 determines at decision block 402 that there is no TLB conflict, processing resumes at block 406.

Figure 5:
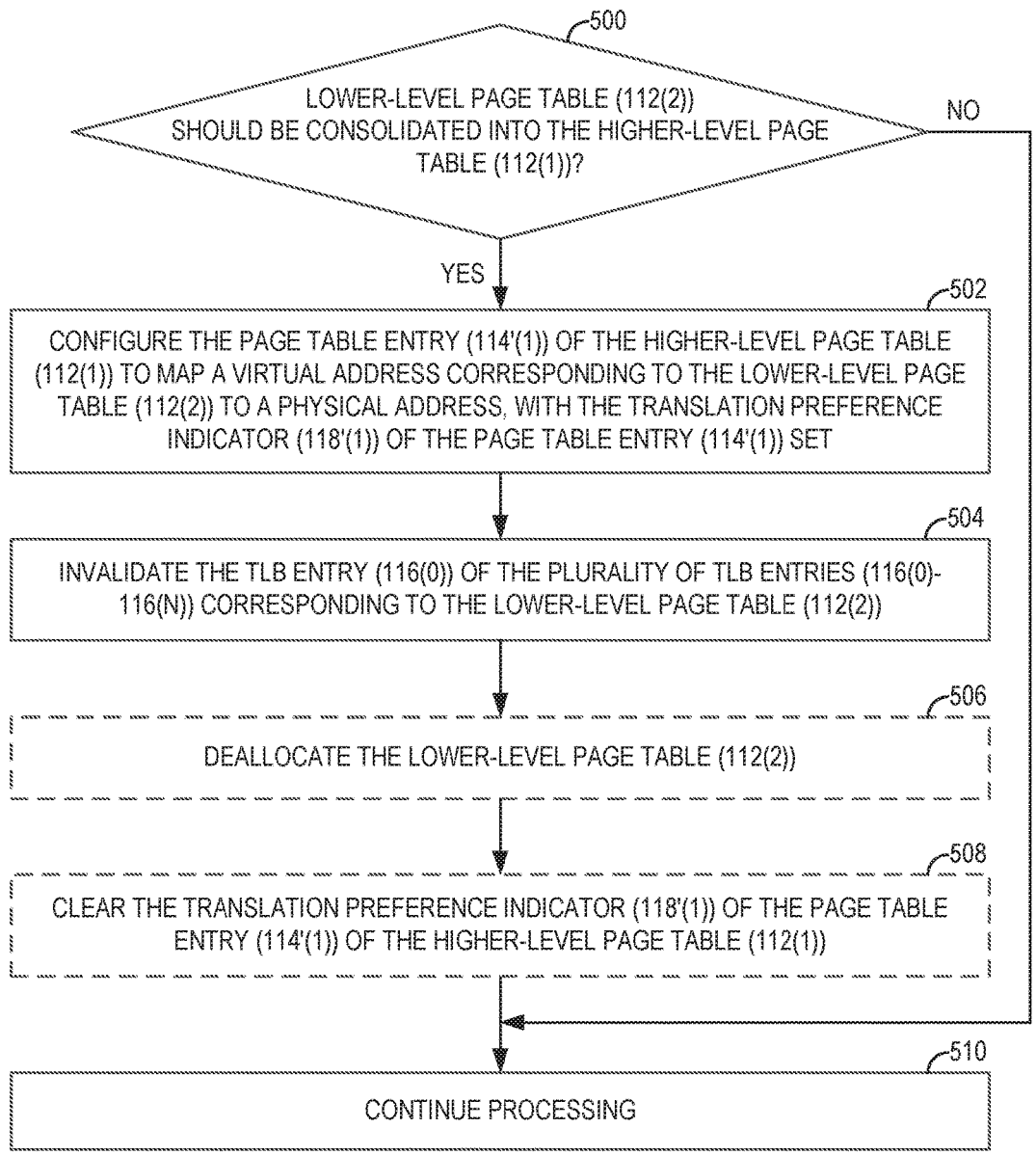
FIG. 5 is a flowchart illustrating further exemplary operations of the memory system of FIG. 1 for setting and clearing a translation preference indicator during consolidation of a lower-level page table into a higher-level page table.

FIG. 5 is a flowchart illustrating further exemplary operations of the memory system 102 of FIG. 1 for setting and clearing a translation preference indicator, such as the translation preference indicator 118(0), during consolidation of a lower-level page table (e.g., the L3 page table 112(2) of FIG. 3) into a higher-level page table (e.g., the L2 page table 112(1) of FIG. 3). For the sake of clarity, elements of FIGS. 1 and 3 are referenced in describing FIG. 5. In FIG. 5, operations begin with the MMU 104 determining whether the lower-level page table 112(2) should be consolidated into the higher-level page table 112(1) (block 500). In this regard, the MMU 104 may be referred to herein as "a means for determining whether the lower-level page table should be consolidated into the higher-level page table." As a non-limiting example, the MMU 104 may determine that consolidation is appropriate when all page table entries 114"(0)-114"(3) of the lower-level page table 112(2) have been mapped.

If the MMU 104 determines at decision block 500 that the lower-level page table 112(2) should be consolidated into the higher-level page table 112(1), the MMU 104 configures the page table entry 114'(1) of the higher-level page table 112(1) to map a virtual address corresponding to the lower-level page table 112(2) to a physical address, with the translation preference indicator 118'(1) of the page table entry 114'(1) set (block 502). Accordingly, the MMU 104 may be referred to herein as "a means for configuring the page table entry of the higher-level page table to map a virtual address corresponding to the lower-level page table to a physical address, with the translation preference indicator of the page table entry set, responsive to determining that the lower-level page table should be consolidated into the higher-level page table." In this manner, the MMU 104 indicates that the page table entry 114'(1), after being cached in the TLB 106, should be selected over any conflicting TLB entries (such as the TLB entry 116(0)) for use for virtual-to-physical memory address mapping operations.

The MMU 104 then invalidates the TLB entry 116(0) of the plurality of TLB entries 116(0)-116(N) corresponding to the lower-level page table 112(2) (block 504). In this regard, the MMU 104 may be referred to herein as "a means for invalidating a TLB entry of the plurality of TLB entries corresponding to the lower-level page table." In some aspects, the MMU 104 may then deallocate the lower-level page table 112(2) (block 506). The MMU 104 may thus be referred to herein as "a means for deallocating the lower-level page table." Afterwards, the MMU 104 may clear the translation preference indicator 118'(1) of the page table entry 114'(1) of the higher-level page table 112(1) (block 508). Accordingly, the MMU 104 may be referred to herein as "a means for clearing the translation preference indicator of the page table entry of the higher-level page table." Processing then resumes (block 510). If the MMU 104 determines at decision block 500 that no consolidation should take place, processing resumes at block 510.

Figure 6:
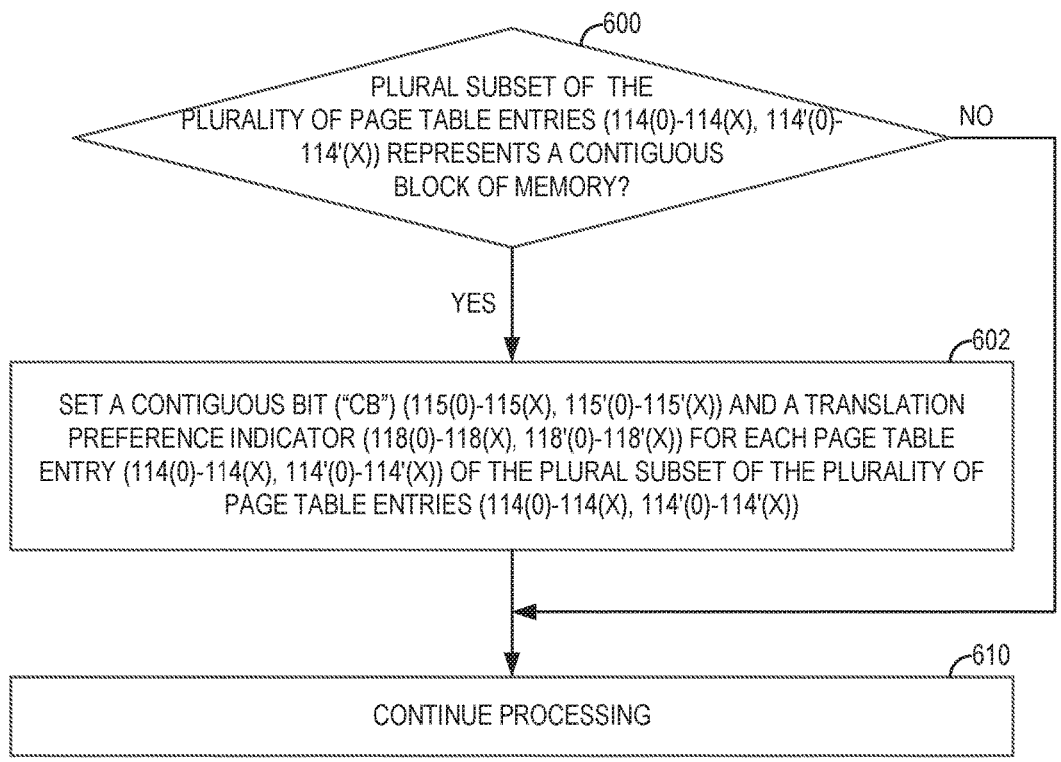
FIG. 6 is a flowchart illustrating further exemplary operations of the memory system of FIG. 1 for setting translation preference indicators along with contiguous bits of a page table.

FIG. 6 is provided to illustrate additional exemplary operations of the memory system 102 of FIG. 1 for setting the translation preference indicators 118(0)-118(X), 118'(0)-118'(X) along with the contiguous bits ("CB") 115(0)-115(X), 115'(0)-115'(X) of the hierarchical page tables 112(0)-112(Y). For the sake of clarity, elements of FIG. 1 are referenced in describing FIG. 6. In FIG. 6, operations begin with the MMU 104 determining whether a plural subset of the plurality of page table entries 114(0)-114(X), 114'(0)-114'(X) represents a contiguous block of memory (block 600). In this regard, the MMU 104 may be referred to herein as "a means for determining whether a plural subset of the plurality of page table entries represents a contiguous block of memory."

If the MMU 104 determines at decision block 600 that there is a plural subset of the plurality of page table entries 114(0)-114(X), 114'(0)-114'(X) representing a contiguous block of memory, the MMU 104 sets a contiguous bit ("CB") 115(0)-115(X), 115'(0)-115'(X) and a translation preference indicator 118(0)-118(X), 118'(0)-118'(X) for each page table entry 114(0)-114(X), 114'(0)-114'(X) of the plural subset of the plurality of page table entries 114(0)-114(X), 114'(0)-114'(X) (block 602). Accordingly, the MMU 104 may be referred to herein as "a means for setting a contiguous bit for each page table entry of the plural subset of the plurality of page table entries, responsive to determining that a plural subset of the plurality of page table entries represents a contiguous block of memory." The MMU 104 also may be referred to herein as "a means for setting a translation preference indicator for each page table entry of the plural subset of the plurality of page table entries, responsive to determining that a plural subset of the plurality of page table entries represents a contiguous block of memory." Processing then resumes at block 610. If the MMU 104 determines at decision block 600 that there is no plural subset of the plurality of page table entries 114(0)-114(X), 114'(0)-114'(X) representing a contiguous block of memory, processing continues at block 610.

Figure 7:
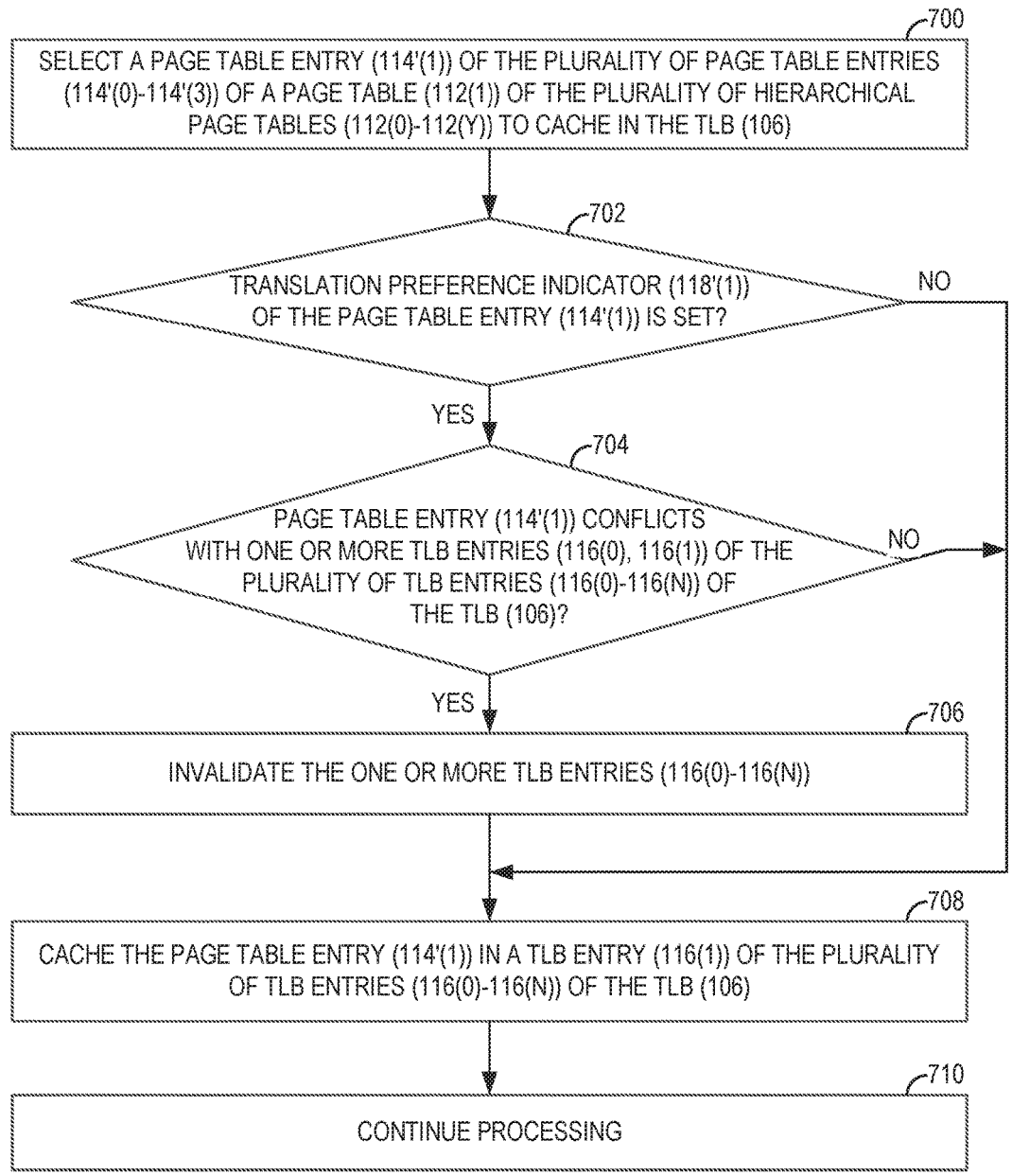
FIG. 7 is a flowchart illustrating further exemplary operations of the memory system of FIG. 1 for identifying and invalidating potentially conflicting TLB entries prior to caching a page table entry having a translation preference indicator that is set.

To illustrate further exemplary operations of the memory system 102 of FIG. 1 for identifying and invalidating potentially conflicting TLB entries (such as the TLB entries 116(0) and 116(1) of FIG. 3) prior to caching a page table entry having a translation preference indicator that is set (such as the page table entry 114'(1) of FIG. 3), FIG. 7 is provided. Elements of FIGS. 1 and 3 are referenced in describing FIG. 7, for the sake of clarity. Operations in FIG. 7 begin with the MMU 104 selecting a page table entry 114'(1) of the plurality of page table entries 114'(0)-114'(3) of a page table 112(1) of the plurality of hierarchical page tables 112(0)-112(Y) to cache in the TLB 106 (block 700). The MMU 104 thus may be referred to herein as "a means for selecting a page table entry of the plurality of page table entries of a page table of the plurality of hierarchical page tables to cache in the TLB." The MMU 104 determines whether the translation preference indicator 118'(1) of the page table entry 114'(1) is set (block 702). In this regard, the MMU 104 may be referred to herein as "a means for determining whether a translation preference indicator of the page table entry is set."

If the MMU 104 determines at decision block 702 that the translation preference indicator 118'(1) is set, the MMU 104 next determines whether the page table entry 114'(1) conflicts with one or more TLB entries 116(0), 116(1) of the plurality of TLB entries 116(0)-116(N) of the TLB 106 (block 704). Accordingly, the MMU 104 may be referred to herein as "a means for determining whether the page table entry conflicts with one or more TLB entries of the plurality of TLB entries of the TLB, responsive to determining that the translation preference indicator of the page table entry is set." If one or more TLB conflicts are detected, the MMU 104 invalidates the one or more TLB entries 116(0)-116(N) (block 706). The MMU 104 thus may be referred to herein as "a means for, responsive to determining that the page table entry conflicts with one or more TLB entries, invalidating the one or more TLB entries." The MMU 104 then caches the page table entry 114'(1) in a TLB entry 116(1) of the plurality of TLB entries 116(0)-116(N) of the TLB 106 (block 708). In this regard, the MMU 104 may be referred to herein as "a means for caching the page table entry in a TLB entry of the plurality of TLB entries of the TLB." Processing then continues (block 710). If the MMU 104 determines at decision block 702 that the translation preference indicator 118'(1) is not set, or determines at decision block 704 that there are no TLB conflicts with the page table entry 114'(1), processing resumes at block 710.

Providing hardware-based TLB conflict resolution in processor-based systems may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 8:
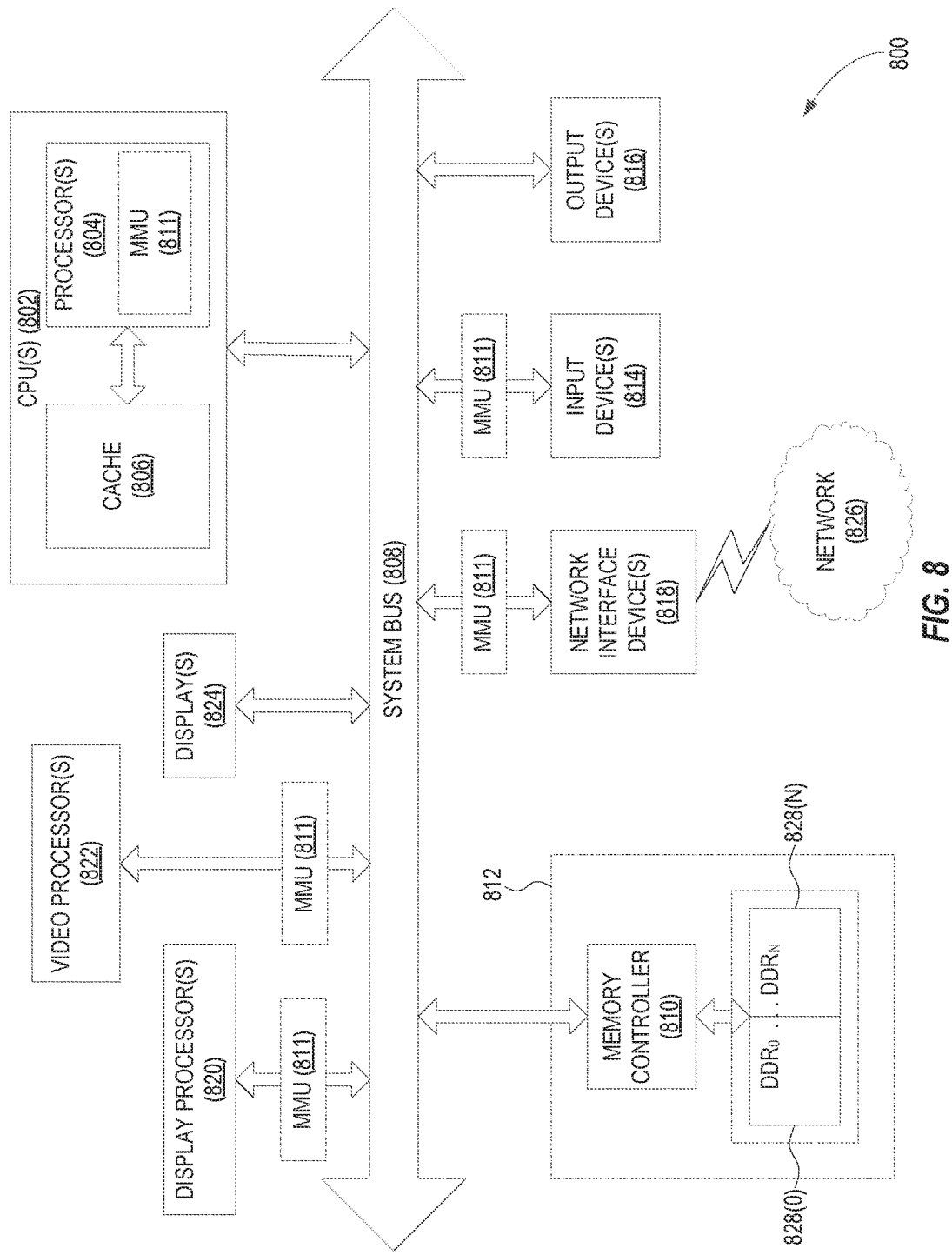
FIG. 8 is a block diagram of an exemplary processor-based system, such as the processor-based system in FIG. 1, that includes a memory system, such as the memory system in FIG. 1, configured to provide hardware-based TLB conflict resolution.

In this regard, FIG. 8 illustrates an example of a processor-based system 800 that may correspond to the processor-based system 100 of FIG. 1. The processor-based system 800 includes one or more CPUs 802, each including one or more processors 804. The CPU(s) 802 may have cache memory 806 coupled to the processor(s) 804 for rapid access to temporarily stored data. The CPU(s) 802 is coupled to a system bus 808 and can intercouple master and slave devices included in the processor-based system 800. As is well known, the CPU(s) 802 communicates with these other devices by exchanging address, control, and data information over the system bus 808. For example, the CPU(s) 802 can communicate bus transaction requests to a memory controller 810 as an example of a slave device. The processor-based system 800 may include one or more MMUs 811, which correspond to the MMU 104 of FIG. 1. The MMUs 811 may comprise an element of the processor(s) 804, and/or may operate as system MMUs 811 connected to the system bus 808.

Other master and slave devices can be connected to the system bus 808. As illustrated in FIG. 8, these devices can include a memory system 812, one or more input devices 814, one or more output devices 816, one or more network interface devices 818, one or more display processors 820, one or more video processors 822, and one or more displays 824, as examples. The input device(s) 814 can include any type of input device, including but not limited to input keys, switches, voice processors, etc. The output device(s) 816 can include any type of output device, including, but not limited to, audio, video, other visual indicators, etc. The network interface device(s) 818 can be any devices configured to allow exchange of data to and from a network 826. The network 826 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 818 can be configured to support any type of communications protocol desired. The memory system 812 may correspond to the memory system 102 of FIG. 1, and can include one or more memory units 828(0)-828(N).

The CPU(s) 802 may also be configured to access the display processor(s) 820 and the video processor(s) 822 over the system bus 808 to control information sent to the display(s) 824. The display processor(s) 820 generate information to be displayed, while the video processor(s) 822 process the information to be displayed into a format suitable for the display(s) 824. The display(s) 824 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in computer-executable instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of non-transitory computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A memory system of a processor-based system, comprising:
   a memory management unit (MMU);
   a plurality of hierarchical page tables each comprising a plurality of page table entries comprising a corresponding plurality of translation preference indicators; and
   a translation lookaside buffer (TLB) comprising a plurality of TLB entries, each TLB entry configured to cache a page table entry of the plurality of page table entries;
   the MMU configured to:
      determine whether a TLB conflict exists between a first TLB entry caching a first page table entry comprising a translation preference indicator that is set and a second TLB entry caching a second page table entry comprising a translation preference indicator that is not set; and
      responsive to determining that a TLB conflict exists, select the first TLB entry for use in a virtual-to-physical address translation operation, based on the translation preference indicator of the first page table entry cached by the first TLB entry being set.

2. The memory system of claim 1, wherein the plurality of TLB entries comprises a corresponding plurality of TLB entry tags each configured to store a translation preference indicator of a corresponding page table entry.

3. The memory system of claim 1, wherein each of the plurality of page table entries of the plurality of hierarchical page tables comprises one of a block entry, a page entry, and a page table pointer entry.

4. The memory system of claim 1, wherein:
   the plurality of hierarchical page tables comprises:
      a lower-level page table; and
      a higher-level page table comprising a page table entry pointing to the lower-level page table; and
   the MMU is further configured to:
      determine whether the lower-level page table should be consolidated into the higher-level page table; and
      responsive to determining that the lower-level page table should be consolidated into the higher-level page table:
         configure the page table entry of the higher-level page table to map a virtual address corresponding to the lower-level page table to a physical address, with the translation preference indicator of the page table entry set; and
         invalidate a TLB entry of the plurality of TLB entries corresponding to the lower-level page table.

5. The memory system of claim 4, wherein the MMU is further configured to:
   deallocate the lower-level page table; and
   clear the translation preference indicator of the page table entry of the higher-level page table.

6. The memory system of claim 1, wherein the MMU is further configured to:
   determine whether a plural subset of the plurality of page table entries represents a contiguous block of memory; and
   responsive to determining that a plural subset of the plurality of page table entries represents a contiguous block of memory:
      set a contiguous bit for each page table entry of the plural subset of the plurality of page table entries; and
      set a translation preference indicator for each page table entry of the plural subset of the plurality of page table entries.

7. The memory system of claim 1, wherein the MMU is further configured to:
   select a page table entry of the plurality of page table entries of a page table of the plurality of hierarchical page tables to cache in the TLB;
   determine whether a translation preference indicator of the page table entry is set;
   responsive to determining that the translation preference indicator of the page table entry is set:
      determine whether the page table entry conflicts with one or more TLB entries of the plurality of TLB entries of the TLB; and
      responsive to determining that the page table entry conflicts with one or more TLB entries, invalidate the one or more TLB entries; and
   cache the page table entry in a TLB entry of the plurality of TLB entries of the TLB.

8. The memory system of claim 1 integrated into an integrated circuit (IC).

9. The memory system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A method for providing hardware-based translation lookaside buffer (TLB) conflict resolution, comprising:
   configuring a plurality of page table entries of a plurality of hierarchical page tables to store a corresponding translation preference indicator;
   determining, by a memory management unit (MMU) of a processor-based system, whether a TLB conflict exists between a first TLB entry of a plurality of TLB entries of a TLB and a second TLB entry of the plurality of TLB entries of the TLB, wherein:
      each TLB entry is configured to cache a page table entry of the plurality of page table entries of the plurality of hierarchical page tables; and
      the first TLB entry caches a first page table entry comprising a translation preference indicator that is set and a second TLB entry caches a second page table entry comprising a translation preference indicator that is not set; and
   responsive to determining that a TLB conflict exists, selecting the first TLB entry for use in a virtual-to-physical address translation operation, based on the translation preference indicator of the first page table entry cached by the first TLB entry being set.

11. The method of claim 10, wherein the plurality of TLB entries comprises a corresponding plurality of TLB entry tags each configured to store a translation preference indicator of a corresponding page table entry.

12. The method of claim 10, wherein each of the plurality of page table entries of the plurality of hierarchical page tables comprises one of a block entry, a page entry, and a page table pointer entry.

13. The method of claim 10, wherein:
the plurality of hierarchical page tables comprises:
  a lower-level page table; and
  a higher-level page table comprising a page table entry pointing to the lower-level page table; and
the method further comprises:
  determining whether the lower-level page table should be consolidated into the higher-level page table; and
  responsive to determining that the lower-level page table should be consolidated into the higher-level page table:
    configuring the page table entry of the higher-level page table to map a virtual address corresponding to the lower-level page table to a physical address, with the translation preference indicator of the page table entry set; and
    invalidating a TLB entry of the plurality of TLB entries corresponding to the lower-level page table.

14. The method of claim 13, further comprising:
deallocating the lower-level page table; and
clearing the translation preference indicator of the page table entry of the higher-level page table.

15. The method of claim 10, further comprising:
determining whether a plural subset of the plurality of page table entries represents a contiguous block of memory; and
responsive to determining that a plural subset of the plurality of page table entries represents a contiguous block of memory:
  setting a contiguous bit for each page table entry of the plural subset of the plurality of page table entries; and
  setting a translation preference indicator for each page table entry of the plural subset of the plurality of page table entries.

16. The method of claim 10, further comprising:
selecting a page table entry of the plurality of page table entries of a page table of the plurality of hierarchical page tables to cache in the TLB;
determining whether the translation preference indicator of the page table entry is set;
responsive to determining that the translation preference indicator of the page table entry is set:
  determining whether a page table entry conflicts with one or more TLB entries of the plurality of TLB entries of the TLB; and
  responsive to determining that the page table entry conflicts with one or more TLB entries, invalidating the one or more TLB entries; and
caching the page table entry in a TLB entry of the plurality of TLB entries of the TLB.

17. A memory system for providing hardware-based translation lookaside buffer (TLB) conflict resolution, comprising:

a means for configuring each of a plurality of page table entries of a plurality of hierarchical page tables to store a corresponding translation preference indicator;
a means for determining whether a TLB conflict exists between a first TLB entry of a plurality of TLB entries of a TLB and a second TLB entry of the plurality of TLB entries of the TLB, wherein:
  each TLB entry is configured to cache a page table entry of the plurality of page table entries of the plurality of hierarchical page tables; and
  the first TLB entry caches a first page table entry comprising a translation preference indicator that is set and a second TLB entry caches a second page table entry comprising a translation preference indicator that is not set; and
a means for selecting the first TLB entry for use in a virtual-to-physical address translation operation, based on the translation preference indicator of the first page table entry cached by the first TLB entry being set, responsive to determining that a TLB conflict exists.

18. The memory system of claim 17, wherein the plurality of TLB entries comprises a corresponding plurality of TLB entry tags each configured to store a translation preference indicator of a corresponding page table entry.

19. The memory system of claim 17, wherein each of the plurality of page table entries of the plurality of hierarchical page tables comprises one of a block entry, a page entry, and a page table pointer entry.

20. The memory system of claim 17 wherein:
the plurality of hierarchical page tables comprises:
  a lower-level page table; and
  a higher-level page table comprising a page table entry pointing to the lower-level page table; and
the memory system further comprises:
  a means for determining whether the lower-level page table should be consolidated into the higher-level page table;
  a means for configuring the page table entry of the higher-level page table to map a virtual address corresponding to the lower-level page table to a physical address, with the translation preference indicator of the page table entry set, responsive to determining that the lower-level page table should be consolidated into the higher-level page table; and
  a means for invalidating a TLB entry of the plurality of TLB entries corresponding to the lower-level page table.

21. The memory system of claim 20, further comprising:
a means for deallocating the lower-level page table; and
a means for clearing the translation preference indicator of the page table entry of the higher-level page table.

22. The memory system of claim 17, further comprising:
a means for determining whether a plural subset of the plurality of page table entries represents a contiguous block of memory;
a means for setting a contiguous bit for each page table entry of the plural subset of the plurality of page table entries, responsive to determining that a plural subset of the plurality of page table entries represents a contiguous block of memory; and
a means for setting a translation preference indicator for each page table entry of the plural subset of the plurality of page table entries, responsive to determining that a plural subset of the plurality of page table entries represents a contiguous block of memory.

23. The memory system of claim 17, further comprising:
a means for selecting a page table entry of the plurality of page table entries of a page table of the plurality of hierarchical page tables to cache in the TLB;
a means for determining whether a translation preference indicator of the page table entry is set;
a means for determining whether the page table entry conflicts with one or more TLB entries of the plurality of TLB entries of the TLB, responsive to determining that the translation preference indicator of the page table entry is set;
a means for, responsive to determining that the page table entry conflicts with one or more TLB entries, invalidating the one or more TLB entries; and
a means for caching the page table entry in a TLB entry of the plurality of TLB entries of the TLB.

\* \* \* \* \*